United States Patent [19]
Hobbs

[11] Patent Number: 5,417,496
[45] Date of Patent: May 23, 1995

[54] BALL BEARING RETAINER FOR TELESCOPING SLIDE ASSEMBLY

[75] Inventor: James D. Hobbs, Plainfield, Ind.

[73] Assignee: General Devices Co., Inc., Indianapolis, Ind.

[21] Appl. No.: 204,622

[22] Filed: Mar. 1, 1994

[51] Int. Cl.$^6$ .................................... F16C 29/04
[52] U.S. Cl. .................................... 384/18; 384/49
[58] Field of Search .............. 384/18, 49, 19, 909, 384/492, 908

[56] References Cited

U.S. PATENT DOCUMENTS

| | | |
|---|---|---|
| 2,606,909 | 8/1952 | Blicke et al. . |
| 3,205,025 | 9/1965 | Jordan . |
| 3,389,949 | 6/1968 | Studinski et al. . |
| 3,469,892 | 9/1969 | Langstroth ................ 384/18 |
| 3,488,097 | 1/1970 | Fall . |
| 3,679,275 | 7/1972 | Fall et al. . |
| 3,687,505 | 8/1972 | Fall et al. . |
| 3,738,716 | 6/1973 | Lambert . |
| 3,801,166 | 4/1974 | York . |
| 5,207,513 | 5/1993 | Kondo et al. ................ 384/492 |

*Primary Examiner*—Lenard A. Footland
*Attorney, Agent, or Firm*—Barnes & Thornburg

[57] ABSTRACT

A bearing retainer assembly for use in a telescoping slide assembly exposed to shock or vibration. Advantageously, this improved retainer assembly is configured to include an innovative arrangement and placement of both steel and plastic ball bearings in a retainer so as to facilitate sliding movement of adjacent slide members in a telescoping slide assembly without suffering from unwanted friction and drag that might otherwise degrade the operability of a slide assembly containing a conventional ball bearing retainer assembly.

12 Claims, 3 Drawing Sheets

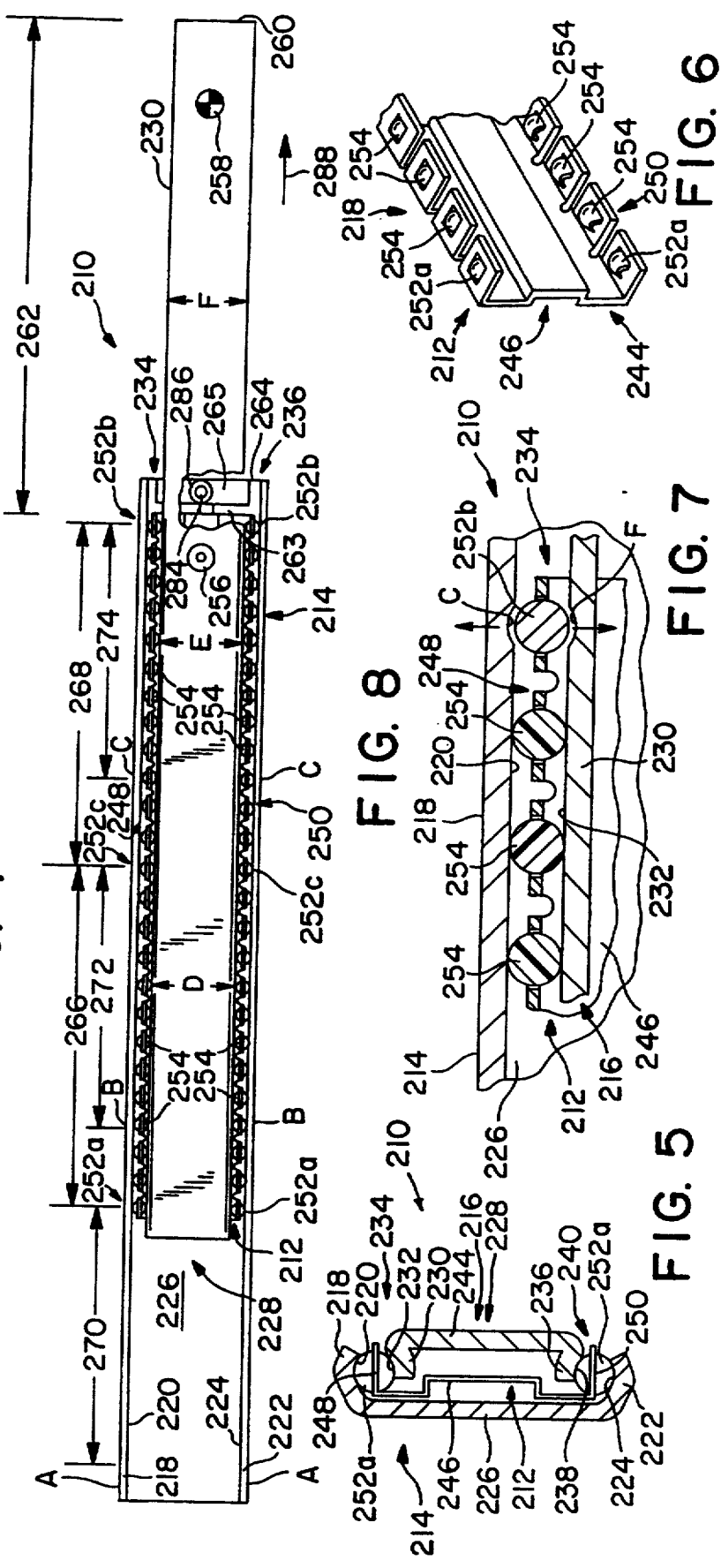

BALL BEARING RETAINER FOR TELESCOPING SLIDE ASSEMBLY

BACKGROUND AND SUMMARY OF THE INVENTION

The present invention relates to telescoping slide assemblies having interconnected slide members, and particularly to bearing mechanisms for enhancing movement of a slide member in a telescoping slide assembly. More particularly, the invention relates to a ball bearing retainer assembly for use in a telescoping slide assembly.

Telescoping slide assemblies are well known. Telescoping slide assemblies have been mounted to drawers and cabinets to permit easy movement of a drawer between a retracted position inside a cabinet and an extended position outside the cabinet. See, for example, U.S. Pat. No. 3,712,690 to Maxwell S. Fall. Slide assemblies can also be used to move equipment-carrying platforms and a wide variety of other items between retracted and extended positions. In some cases, the slide assemblies are mounted on the side of the unit to be moved while in other cases the slide assemblies are included on the bottom of the unit to be moved.

Some telescoping slide assemblies have three interconnected slide members including a stationary slide member, a load-carrying (or chassis) slide member, and an intermediate slide member therebetween. Other telescoping slide assemblies have two interconnected slide members including an outer slide member and an inner slide member that is movable relative to the outer slide member along a path back and forth inside the outer slide member. Of course, a telescoping slide assembly may include more than three slide members.

Ball bearing slide assemblies using ball bearing retainers are well known. See, for example, U.S. Pat. Nos. 2,606,909; 3,205,025; 3,389,949; 3,488,097; 3,679,275; 3,687,505; 3,738,716; 3,801,166; and 4,089,568. These ball bearing retainers move relative to the slide members in each slide assembly.

One problem facing a maker of telescoping slide assemblies is how to develop a way to maintain a smooth running telescoping slide assembly even though the slide assembly is subjected to moderate or severe shock and vibration when it is in its fully retracted closed position. Such a condition could exist, for example, when telescoping slide assemblies are used to support a platform for movement into and out of a vibrating machine as disclosed herein and in the James D. Hobbs et al U.S. patent application Ser. No. 08/207,752, entitled "Low-Profile Slide Structure" filed herewith.

Hardened steel ball bearings are used frequently in ball bearing retainer assemblies of the type used in telescoping slide assemblies. When a telescoping slide assembly is installed in an application where shock and vibration exists, the hardened steel ball bearings used in the retainer assemblies begin to peen a hemispherical depression into the ball bearing raceways provided in the slide members on either side of the steel ball bearings. In effect, each ball bearing is "embedded" into the adjacent softer metal used in the slide members to define the ball bearing raceways during vibration or shock applied to the telescoping slide assembly. Over a period of time, the operability of such a slide assembly can be impaired by the formation of these hammered or peened hemispherical depressions. Whenever such a slide assembly is "cycled" (i.e., moved back and forth between extended and retracted positions), the steel ball bearings are moved rapidly into and out of these peened hemispherical depressions. This creates unwanted friction and drag and impairs slide assembly operation. The rough action of ball bearings moving into and out of peened hemispherical depressions formed in ball bearing raceways is similar to driving a vehicle along and over the ties in a railroad track.

What is needed is an improved ball bearing retainer assembly that is sturdy enough to support sliding movement of even a heavy-duty slide assembly that is exposed to vibration or shock, yet is not hampered by unwanted friction and drag caused by any peened hemispherical depressions that may be formed by vibration or shock while the slide assembly occupies its fully retracted closed position. Such an improvement would be welcomed by consumers that use telescoping slide assemblies in environments which expose those assemblies to shock and vibration.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which:

FIG. 4 is a top plan view of a two-piece telescoping slide assembly including a ball bearing retainer assembly in accordance with the present invention showing the position of the ball bearing retainer assembly when the inner slide member occupies its fully retracted closed position inside the outer slide member;

FIG. 5 is a transverse sectional view taken along line 5—5 of FIG. 4;

FIG. 6 is a perspective view of a portion of the ball bearing retainer assembly of FIG. 4 showing two rows of ball bearings mounted in a ball bearing retainer;

FIG. 7 is an enlarged view of region 6 circled in FIG. 4 showing three ball bearings made of plastics material and one ball bearing made of steel held in a raceway formed between the inner and outer slide members and showing peened hemispherical depressions formed in each of the inner and outer slide members by vibrating movement of the steel ball bearing located at the right end of the ball bearing retainer during exposure of the telescoping slide assembly to shock or vibration when the inner slide member occupies its fully retracted closed position inside the outer slide member; and FIG. 8 is a view similar to FIG. 4 showing movement of the inner slide member to its fully extended position and demonstrating that none of the six spaced-apart steel ball bearings held in the ball bearing retainer assembly contact any of the six peened hemispherical depressions formed in each of the inner and outer slide members by the steel ball bearings as the inner slide member moves back and forth between its fully retracted and fully extended positions.

DETAILED DESCRIPTION OF THE DRAWINGS

Figure 1:
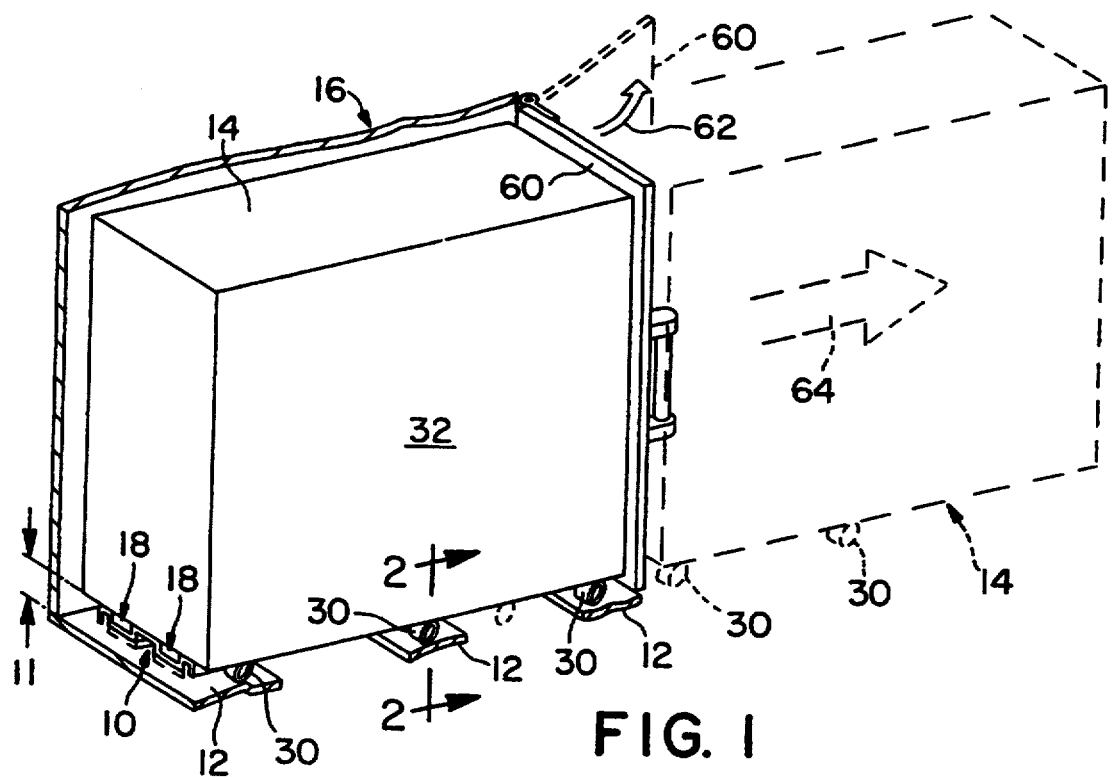
FIG. 1 is a perspective view of a cabinet, with portions broken away, showing slide apparatus according to the present invention positioned between cabinet cross members and an overlying piece of equipment and arranged to move the equipment between a retracted position inside the cabinet (shown in solid lines) and an extended position outside the cabinet (shown in dotted lines)
Figure 2:
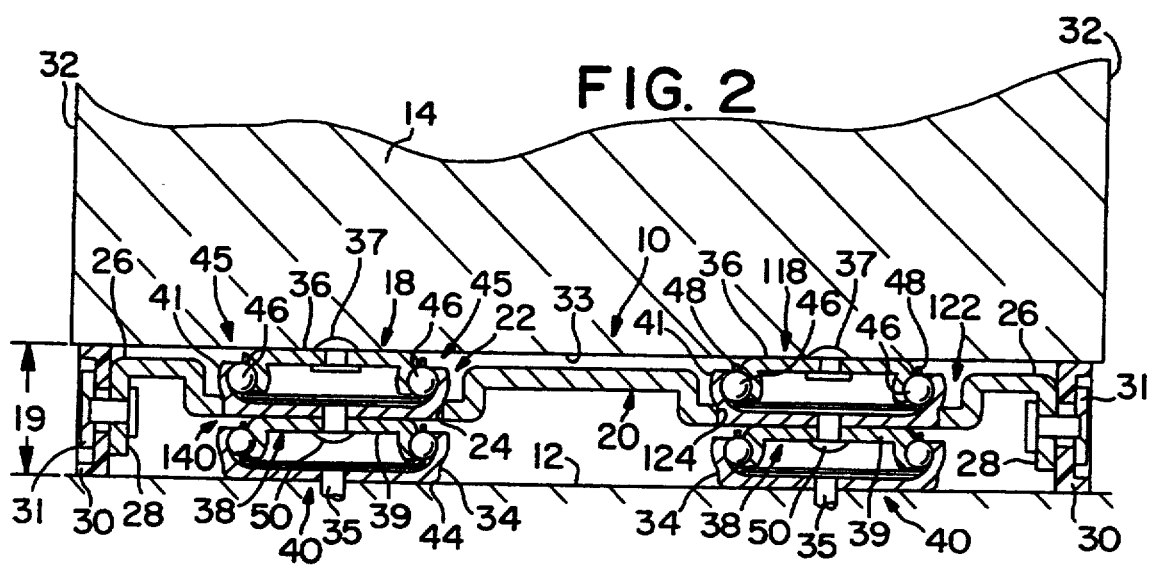
FIG. 2 is a sectional view taken along line 2—2 of FIG. 1 of a telescoping slide apparatus showing a pair of bottom-mounted telescoping slide assemblies positioned between the cabinet and the equipment, a plate member having channels with apertures formed therein for receiving the slide assemblies, and rollers coupled to skirts depending from lateral edges of the plate member to provide lateral support to the equipment.

An environment in which telescoping slide assemblies are exposed to vibration and shock is shown, for example, in FIGS. 1 and 2. While the illustrated environment shows telescoping slide assemblies used to move equipment into and out of a cabinet containing a vibrating or shaking machine, it will be understood that there are many other operating environments in which a telescoping slide assembly may be subjected to shock or vibration.

An improved ball bearing retainer assembly for use in a telescoping slide assembly exposed to shock or vibration is shown in FIGS. 4–8. Advantageously, this improved retainer assembly is configured to include an innovative arrangement and placement of both steel and plastic ball bearings in a retainer so as to facilitate sliding movement of adjacent slide members in a telescoping slide assembly without suffering from unwanted friction and drag that might otherwise degrade the operability of a slide assembly containing a conventional ball bearing retainer assembly. As will be described in more detail below, the steel and plastic ball bearings are held by the retainer in a predetermined sequence and spacing to minimize noise, friction, and drag associated with extension and retraction of slide members in a telescoping slide assembly.

A telescoping slide apparatus 10 is shown in FIG. 1 operably supported inside a cabinet 16 containing a vibrating or shaking machine (not shown) by a cabinet support surface or cross members 12. The slide apparatus 10 is positioned between the cabinet support surface or cross member 12 and a piece of equipment 14 to support the equipment 14 for movement between a retracted position inside a cabinet 16 (solid lines) and an extended position outside the cabinet 16 (dotted lines).

The slide apparatus 10 has a desirably low profile and is sized to fit in the vertical clearance space 11 between the cabinet support surface on cross members 12 and the bottom of the piece of equipment 14. Slide apparatus 10 includes an extra rigidifying plate member 20 which is configured to enhance the stability of slide apparatus 10 without increasing the vertical height of slide apparatus 10.

Figure 3:
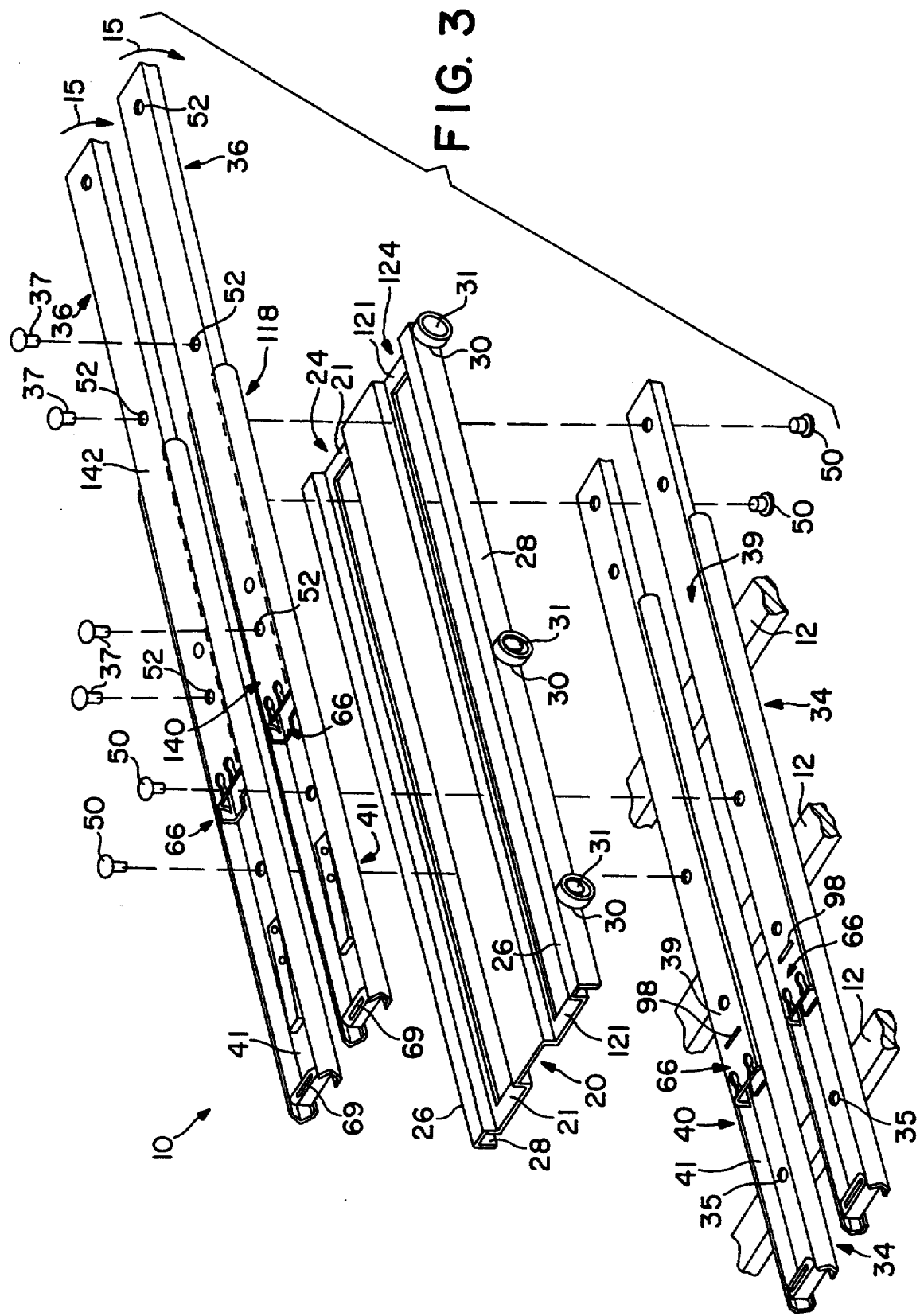
FIG. 3 is an exploded perspective view of the telescoping slide apparatus of FIGS. 1 and 2 showing a pair of stationary slide members mounted on the underlying cabinet support surfaces, a single plate member arranged to mount onto the underlying stationary slide members and formed to include spaced-apart longitudinally extending channels, a pair of intermediate slide members sized to fit into the longitudinally extending channels in the plate member, and overlying chassis slide members which mount onto the intermediate slide members and carry the equipment into and out of the cabinet shown in FIG. 1.

Referring to FIGS. 2 and 3, the slide apparatus 10 includes a pair of telescoping slide assemblies 18, 118 held in parallel spaced-apart relation by a plate member 20. The plate member 20 is formed to define a pair of longitudinally extending channels 22, 122, each channel 22, 122 having an aperture 24, 124, respectively, for receiving the slide assemblies 18, 118. The channels 22, 122 include transverse brace portions 21, 121 (shown in FIG. 3) which define the ends of apertures 24, 124 and provide support for the slide assemblies 18, 118. The slide assemblies 18, 118 are positioned in the apertures 24, 124, respectively, and rigidly attached to the plate member 20 such as by welding or other suitable attachment means.

While the longitudinally extending channels 22, 122 could be eliminated, the channels 22, 122 serve an important strengthening function. For example, one problem associated with the use of multiple slide assemblies 18, 118 to support a piece of equipment 14 is differential flexing of the slide assemblies 18, 118 when the slide assemblies 18, 118 are fully extended. Due to slight variations between slide assemblies 18, 118, one slide member 18 might flex along its longitudinal axis 13 in direction 15 (FIG. 3) a little more than an adjacent slide assembly 118. Rigidly attaching the slide assemblies 18, 118 to the plate member 20 takes advantage of the strengthening function of the channels 22, 122 to reduce any differential flexing of the slide assemblies 18, 118 along their respective longitudinal axes when the equipment 14 is moved to an extended position outside of the cabinet 16.

The plate member 20 also includes longitudinally extending lateral edges 26. A skirt 28 depends downwardly from each lateral edge 26 and serves two functions. First, the skirt 28 adds strength to the apparatus 10 to augment the strengthening function of the channels 22, 122. Second, it provides attachment points for a plurality of rollers 30 shown in FIGS. 1–3. The rollers 30 are loosely coupled to each skirt 28 by rivets 31 or other suitable coupling means. The loose coupling of the rollers 30 permits rotational and translational movement of the rollers 30 in a plane parallel to the skirt 28 but does not allow for movement of the rollers 30 along the longitudinal axis of the rivets 31.

One illustrative application for the slide apparatus 10 is shown in FIG. 1, wherein the slide apparatus 10 includes three rollers 30 attached to each skirt 28. Of course, the number and placement of the rollers 30 is not limited to the illustrated embodiment, but is dictated by a particular application.

The lateral stability of the equipment 14 is enhanced by positioning the skirts 28 near the lateral sides 32 of the equipment 14 and sizing the rollers 30 to have an outer diameter equal to the vertical height 19 of the slide assemblies 18, 118. As shown in FIG. 2, the rollers 30 wedge between the cabinet support surface or cross member 12 and the equipment 14 when the equipment 14 is retracted into the cabinet, thereby enhancing the lateral stability of the equipment 14 and reducing transverse oscillations of the equipment 14. The plate member 20 preferably has a lateral dimension that locates each skirt 28 so that the rollers 30 can be positioned at or near the sides 32 of the equipment 14 as shown in FIG. 2 in order to provide maximum lateral support to the equipment 14 as it is moved into and out of the cabinet.

Each telescoping slide assembly 18, 118 includes a stationary slide member 34 rigidly attached to the cabinet support surface or cross member 12 by a screw 35 or other suitable attachment means as shown in FIG. 2 and a chassis slide member 36 rigidly attached to the bottom wall 33 of the equipment 14 by rivet 37 or other suitable attachment means as shown in FIG. 2. An intermediate slide member 38 fits into each of the elongated apertures 24, 124 formed in the plate member 20 and slidably interconnects the stationary and chassis slide members 34, 36 for movement along a longitudinal axis between a retracted position and an extended position. Each intermediate slide member 38 includes a top section 41 and a bottom section 39 as shown in FIGS. 2 and 3. Rivets 50 or other suitable attachment means are used to hold the top and bottom sections 41 and 39 of each intermediate slide member 38 together as shown in FIGS. 2 and 3. Each top section 41 is illustratively welded to the plate member 20 to attach each intermediate slide member 38 to the plate member 20.

Slide assemblies 18, 118 are constructed by fastening subassemblies 40, 140 together in top-to-bottom fashion as shown best in FIG. 3. Subassembly 40 includes stationary slide member 34 and the bottom section 39 of intermediate slide member 38. Subassembly 140 includes the top section 41 of intermediate slide member 38 and the chassis slide member 36. Suitable subassemblies 40, 140 are disclosed, for example, in U.S. Pat. No. 4,089,568, issued to Fall on May 16, 1978. A plurality of ball bearings 46 are retained in bearing races 45 provided in these slide members by a bearing retainer 48 as shown in FIG. 2. A preferred embodiment of an improved bearing retainer assembly is illustrated in FIGS. 4-7 described below. Essentially, the preferred bearing retainer assembly contains both steel and plastic balls arranged and placed in an innovative pattern and sequence within the bearing retainer that is not disclosed in the Fall '568 patent and that minimizes noise and drag during extension and retraction of the slide members.

Referring to FIG. 3, in constructing the slide assemblies 18, 118, the top and bottom sections 41, 39 of the intermediate slide members 38 are rigidly held together. Illustratively, rivets 50 are used to attach the sections 39, 41 together, but any other suitable attachment means can be used. The attached sections 39, 41 cooperate to form the intermediate slide member 38 of the completed telescoping slide assembly 18, 118.

As shown in FIG. 2, the top section 41 is aligned with one of the apertures 24, 124 formed in the plate member 20. When the top sections 41 are positioned in the apertures 24, 124, they can be welded, or otherwise rigidly attached, in place. Thus, when the top and bottom sections 41, 39 are fastened together to create the intermediate side assemblies 38, the resulting telescoping slide assemblies 18, 118 are rigidly attached to the plate member 20.

Advantageously, using apertures 24, 124 sized to receive the telescoping slide assemblies 18, 118 permits the slide assemblies 18, 118 to be rigidly attached to the plate member 20 without increasing the vertical height 19 of the slide assembly 18, 118. As shown in FIG. 2, the vertical height of the telescoping slide apparatus 10 must fit within the existing vertical clearance space 19 between the cabinet support surface 12 and the bottom wall 33 of the equipment 14. The plate member 20 advantageously increases the rigidity and stability of the telescoping slide apparatus 10 without increasing the total vertical height of the apparatus 10. Thus, slide apparatus 10 can be cost-effectively installed in an existing cabinet having a predetermined vertical clearance space 19.

The chassis slide members 36 can be provided with apertures 52 for receiving rivets 37 or the like for attaching the telescoping slide assemblies 18, 118 to the equipment 14. Likewise, the stationary slide members 34 can be provided with apertures 53 for receiving rivets 35 or the like for attaching the telescoping slide assemblies 18, 118 to the cabinet support surface or cross members 12.

In practice, when the equipment 14 is fully retracted into the cabinet 16, as shown in FIG. 1, the rollers 30 are positioned to be wedged between the cross members 12 and the equipment 14 to provide lateral stability. As the equipment 14 extends out of the cabinet 16, the rollers 30 move out of the wedged position and no longer provide lateral stability to the equipment 14. The door 60 of the cabinet 16 is closed when the equipment is fully retracted inside the cabinet 16 as shown in solid lines in FIG. 1. In this configuration, the equipment 14 can be safely operated to shake blood or any other stored material in equipment 14 because the rollers 30 are wedged between the cross members 12 and the equipment 14 to provide lateral stability to the equipment 14 to minimize transverse oscillations.

When the blood or other stored material has been shaken, the door 60 is opened in the direction of arrow 62, as shown open in dotted lines 1 in FIG. 1, and the equipment 14 is extended out of the cabinet 16 in the direction of arrow 64. In the extended position shown in dotted lines in FIG. 1, the plate member 20 minimizes differential flexing of the telescoping slide assemblies 18, 118 to reduce greatly the tendency of the equipment 14 to lean in one direction. Advantageously, this allows easier loading and unloading of blood or other stored material into and out of the cabinet.

A two-piece telescoping slide assembly 210 including an innovative ball bearing retainer assembly 212 is shown in FIG. 4. Slide assembly 210 includes an outer slide member 214 and an inner slide member 216. The ball bearing retainer assembly 212 is positioned to lie between the outer and inner slide members 214, 216 during relative movement between those two slide members 214, 216. Preferably, this ball bearing retainer assembly 212 is the one used in the telescoping slide assembly 10 shown in FIGS. 1-3. As shown in FIG. 4, ball bearing retainer assembly 212 can be used to support sliding movement between any two interconnected slide members.

The innovative ball bearing retainer assembly 212 is configured to hold both steel and plastic ball bearings in a predetermined sequence designed to minimize friction and drag during movement of the inner slide member 216 relative to the outer slide member 214. This feature is especially desirable if the outer and inner slide members 214, 216 are exposed to vibration or shock when the inner slide member 216 is in a fully retracted position within the outer slide member 214 as shown in FIGS. 4 and 6. For example, the ball bearing retainer assembly 212 is well suited for use in telescoping slide assemblies 10 shown in FIGS. 1-3 and used to extend and retract equipment containing vibrating or shaking machines. Although the embodiment of FIGS. 1-3 shows a vibration source carried by a slide assembly, it will be understood that ball bearing retainer assembly 212 is equally well suited for use in a slide assembly mounted to a source of vibration.

As shown best in FIGS. 4 and 5, outer slide member 214 includes a first longitudinally extending curled lip 218 formed to define a first outer raceway 220, a second longitudinally extending curled lip 222 formed to define a second outer raceway 224, and a flat portion 226 interconnecting the first and second curled lips 218, 222. The first and second curled lips 218, 222 are arranged to lie in spaced-apart parallel relation to define a longitudinally extending slide-receiving passageway 228 therebetween.

The inner slide member 216 fits in the slide-receiving passageway 228 and includes a first longitudinally extending curled lip 230 formed to define a first inner raceway 232 facing toward first outer raceway 220 and cooperating to define a first bearing channel 234 therebetween. The inner slide member 216 also includes a second longitudinally extending curled lip 236 formed to define a second inner raceway 238 facing toward the second outer raceway 224 and cooperating to define a second bearing channel 240 therebetween. A flat portion 242 interconnects the first and second curled lips 230, 236 as shown best in FIG. 5.

The ball bearing retainer assembly 212 includes a retainer 244 having an elongated central portion 246, a first side rail 248 appended to one side of the central portion 246 and configured to hold a first group of ball bearings, and a second side rail 250 appended to the opposite side of the central portion 246 and configured to hold a second group of ball bearings. Illustratively, each side rail 248, 250 includes a plurality of bent tabs, each bent tab formed to include a single bearing-retaining aperture, as shown in FIG. 6. Alternatively, straight side walls of the type disclosed in U.S. Pat. No. 4,089,568 to Martin K. Fall could be used.

As shown in FIGS. 4, 5, 7, and 8, the retainer 244 is positioned to slide back and forth in the slide-receiving passageway 228 during relative movement between the inner and outer slide members 216, 214. The first side rail 248 of retainer 244 holds the first group of ball bearings in the first bearing channel 234 and maintains the spacing between the individual bearings. Likewise, the second side rail 250 of retainer 244 holds the second group of ball bearings in the second bearing channel 240 and maintains the spacing between the individual bearings.

Six hardened steel ball bearings 252 and forty-four nylon ball bearings 254 are mounted in a special pattern and sequence in retainer 244 as shown in FIGS. 4 and 8. In the first bearing channel 234, a first steel ball bearing 252a is mounted at the left end of retainer 244, a second steel ball bearing 252b is mounted at the right end of retainer 244, and a third steel ball bearing 252c is mounted midway between the first and second steel ball bearings 252a, b. Likewise, in the second bearing channel 240, a first steel ball bearing 252a is mounted at the left end of retainer 244, a second steel ball bearing 252b is mounted at the right end of retainer 244, and a third steel ball bearing 252c is mounted midway between the first and second steel ball bearings 252a, b. As also shown in FIG. 4, in each of the first and second bearing channels 234, 240, eleven nylon ball bearings 254 are mounted to lie between steel ball bearings 252a, c and eleven nylon ball bearings 254 are mounted to lie between steel ball bearings 252c, b.

One advantage of using hardened steel ball bearings in a telescoping slide assembly is that they provide good sliding support by preventing the sliding inner slide member 216 from "dropping down" and interfering with the outer slide member 214. Also, hardened steel ball bearings do not lose their shape and therefore minimize unwanted skidding action which can occur when ball bearings lose their shape. However, when a telescoping slide assembly is installed in an application where shock and vibration exists, each hardened steel ball bearing is vibrated and begins to peen a hemispherical depression into each adjacent raceway. This peening can interfere with operation of the telescoping slide assembly over time.

As shown in FIG. 4, only a few widely spaced-apart steel ball bearings 252 are used in ball bearing retainer assembly 212. As will be described below, the spacing distance between each pair of "adjacent" steel ball bearings (e.g., 252a, c and 252c, b) in each bearing channel 234, 240 is selected as a function of the distance that the inner slide member 216 moves relative to the outer slide member 214 between its fully retracted and extended positions. Ball bearings 254 made of any suitable plastics material such as nylon fill in the gaps between the carefully spaced-apart steel ball bearings 252. The number of nylon ball bearings 254 between each pair of adjacent steel ball bearings 252 can vary from one application to another without limiting the scope of the present invention. Importantly though, ball bearings 254 made of plastics material or any other suitable soft material will absorb shock and vibration and will not peen hemispherical depressions into each adjacent raceway. Moreover, these relatively "soft" ball bearings 254 are also quiet and will cross over peened hemispherical depressions made earlier by the hardened steel ball bearings 252 without creating the noise, friction, and drag associated with such crossings made by steel ball bearings.

Referring again to FIGS. 4 and 7, it will be seen that, during exposure to vibration and shock, each steel ball bearing 252 will create one peened hemispherical depression in the adjacent outer raceway and another peened hemispherical depression in the adjacent inner raceway. For example, in the first bearing channel 234, steel ball bearings 242a, c, b will create depressions A, B, C in the first outer raceway 220, respectively, and create depressions D, E, F in the first inner raceway 232, respectively. Also, in the second bearing channel 240, steel ball bearings 252a, c, b will create depressions A, B, C in the second outer raceway 224, respectively, and create depressions D, E, F in the second inner raceway 238, respectively.

Once the steel ball bearings 252 are spaced apart properly in the retainer 244 in accordance with the present invention, no steel ball bearing 252 will ever pass across a peened hemispherical depression A, B, C, D, E, or F in either the inner or outer slide member 216, 214 during movement of the inner slide member 216 between its fully retracted position shown in FIG. 4 and its fully extended position shown in FIG. 8. Only the softer plastic ball bearings 254 will quietly and easily pass over these depressions without impairing smooth operation of the telescoping slide assembly 210. Position markings 256, 258 have been added to inner slide member 216 to make it easier to "watch" the inner slide member 216 as it moves between its fully retracted position shown in FIG. 4 and its fully extended position shown in FIG. 8 and are not, as such, a part of the present invention.

In operation, as shown in FIG. 8, a leading edge 260 of the inner slide member 216 is moved a distance 262 relative to the leading edge 264 of the outer slide member 214 as the inner slide member 216 moves from the fully retracted position shown in FIG. 4 to the fully extended position shown in FIG. 8. Stop means 263 is provided for limiting movement of inner slide member 216 away from outer slide member 214. For example, stop means 263 includes a pair of lances formed in the inner slide member 216 and provided to engage the inner slide member 216 and block it from moving past its fully extended position shown in FIG. 8 during extension of inner slide member 216 in direction 288.

As shown in FIG. 8, each of (1) the predetermined fixed distance 266 between steel ball bearings 262a, c and (2) the predetermined fixed distance 268 between steel ball bearings 252c, b is greater than one-half of the distance 262 traveled by the leading edge 260 of the inner slide member 216 as it moves between its fully retracted and extended positions. In other words, the distance 262 moved by the inner slide member 216 is less than twice the distance 266 or 268 between each pair of adjacent steel ball bearings 252.

Steel ball bearing 252 movement is shown clearly in FIG. 8. The left side steel ball bearings 252a in the first and second bearing channels 234, 240 move distance 270 as inner slide member 216 is fully extended and never cross over any of the peened hemispherical depressions B, C, E, or F. The middle steel ball bearings 252c move distance 272 at the same time and never cross over any of depressions A, C, D, or F. Finally, the right side steel ball bearings 252b move distance 274 at the same time and never cross over any of depressions A, B, D, or E. Only ball bearings 254 made of plastics or softer materials cross over depressions B, C, D, E, and F as the inner slide member 216 is moved to its fully extended position.

A fixed skid pad 265 is mounted at the outermost end of the outer slide member 264 adjacent to stop means 263 as shown in FIGS. 4 and 8 by means of a flat-head rivet 284 and washer 286. As shown in FIG. 8, one function of skid pad 265 is to support a load carried by the inner slide member 216. The skid pad 265 is a thin piece of plastics material such as Ultra High Molecular Weight (UHMW) polyethylene which contacts with lower portions 230, 236 of the inner slide member 216 during extension of the inner slide member w16.

Whenever the inner slide member 216 is extended to position the center of mass of load mostly over the movable ball bearing retainer assembly 212, the load will cause elongated rail-like lower portions 230, 236 of inner slide member 216 to engage the underlying skid pad 265 and transfer the load to skid pad 265. Although the skid pad 265 is a welcome improvement to horizontally mounted slide assemblies, it can also be used in vertically mounted slide assemblies.

Although the invention has been described in detail with reference to a certain preferred embodiment, variations and modifications exist within the scope and spirit of the invention as described and defined in the following claims.

I claim:

1. A slide assembly comprising
an outer slide member having a leading end,
an inner slide member coupled to the outer slide member for relative longitudinal movement, the inner slide member having a leading end located to move away from the leading end of the outer slide member during movement of the inner slide member to a fully extended position and toward the leading end of the outer slide member during movement of the inner slide member to a fully retracted position, the inner and outer slide members cooperating to define a longitudinal first bearing channel therebetween along one side of the inner slide member and a longitudinal second bearing channel therebetween along an opposite side of the inner slide member, a plurality of steel ball bearings and plastic ball bearings disposed in each of the first bearing channel and the second bearing channel, bearing retainer means for maintaining a predetermined distance between each pair of steel ball bearings in the first bearing channel and each pair of steel ball bearings in the second bearing channel during relative movement of the inner and outer slide members so that each steel ball bearing is situated to define an initial position on the outer slide member when the inner slide member is in its fully retracted position, and means for engaging the inner slide member to limit movement of the leading end of the inner slide member relative to the leading end of the outer slide member to an extension distance less than twice said predetermined distance during movement of the inner slide member toward its fully extended position so that none of the steel ball bearings pass over an initial position on the outer slide member defined by another of the steel ball bearings during movement of the inner slide member between its fully extended and retracted positions.

2. The slide assembly of claim 1, wherein the bearing retainer means further includes means for maintaining longitudinal spacing between the plastic ball bearings disposed between pairs of steel ball bearings disposed in each of the first and second bearing channels.

3. A slide assembly comprising
an outer slide member having a leading end,
an inner slide member coupled to the outer slide member for relative longitudinal movement, the inner slide member having a leading end located to move away from the leading end of the outer slide member during movement of the inner slide member to a fully extended position and toward the leading end of the outer slide member during movement of the inner slide member to a fully retracted position, the inner and outer slide member cooperating to define a longitudinal first bearing channel along one side of the inner slide member and a longitudinal second bearing channel along an opposite side of the inner slide member, and a ball bearing retainer including first means for holding a first row of ball bearings in the first bearing channel during relative movement of the inner and outer slide members and second means for holding a second row of ball bearings in the second bearing channel during relative movement of the inner and outer slide members, each row of ball bearings including a first set of ball bearings made of hardened steel and a second set of ball bearings made of a softer dissimilar material.

4. The slide assembly of claim 3, wherein the second set of ball bearings are made of a plastics material.

5. The slide assembly of claim 4, wherein said plastics material is nylon.

6. The slide assembly of claim 3, wherein the ball bearing retainer is an elongated member sliding between the inner and outer slide members and having a first end and a second end and the first and second means each hold a first hardened steel ball bearing adjacent to said first end and a second hardened steel ball bearing adjacent to said second end.

7. The slide assembly of claim 6, wherein the first and second means each hold a third hardened steel ball bearing at a point midway between the first and second hardened steel ball bearings during relative movement of the inner and outer slide members.

8. The slide assembly of claim 7, wherein the first and second means each hold a first portion of the second set of ball bearings between the first and third hardened steel ball bearings and a second portion of the second set of ball bearings between the third and second hardened steel ball bearings during relative movement of the inner and outer slide members.

9. The slide assembly of claim 8, wherein the second set of ball bearings are made of a plastics material.

10. A slide assembly comprising
an outer slide member formed to include longitudinally extending first and second outer raceways, the first and second outer raceways being arranged to lie in spaced-apart relation to define a slide-receiving passageway therebetween,
an inner slide member mounted for sliding movement in the slide-receiving passageway, the inner slide member including a longitudinally extending first inner raceway arranged to lie in spaced-apart parallel mating relation to the first outer raceway to define a first bearing channel and a longitudinally extending second inner raceway arranged to lie in spaced-apart parallel mating relation to the second outer raceway to define a second bearing channel,
means for limiting movement of the inner slide member relative to the outer slide member along the slide-receiving passageway from a fully retracted position alongside the outer slide member to a fully extended position wherein a leading end of the inner slide member extends a first distance away from a leading end of the outer slide member,
a plurality of steel ball bearings and plastic ball bearings disposed in each of the first bearing channels and in the second bearing channel to support the inner and outer slide members for relative longitudinal movement, and
a bearing retainer including a retainer plate positioned to slide in the slide-receiving passageway and lie between the inner and outer slides, first retainer means for maintaining a second distance greater than one-half of said first distance between each pair of steel ball bearings disposed in the first bearing channel and for maintaining longitudinal spacing between the plastic ball bearings disposed in the first bearing channel and located between the steel ball bearings disposed in the first bearing channel, and second retainer means for maintaining said second distance between each pair of steel ball bearings disposed in the second bearing channel and for maintaining longitudinal spacing between the plastic ball bearings disposed in the second bearing channel and located between the steel ball bearings disposed in the second bearing channel.

11. The slide assembly of claim 10, wherein the retainer plate is an elongated member having a first end and a second end and the first and second retainer means each hold a first steel ball bearing adjacent to the first end and a second steel ball bearing adjacent to the second end.

12. The slide assembly of claim 11, wherein the first and second retainer means each hold a third steel ball bearing at a point midway between the first and second steel ball bearings during relative movement of the inner and outer slide members.

* * * * *